United States Patent Office 3,325,904
Patented June 20, 1967

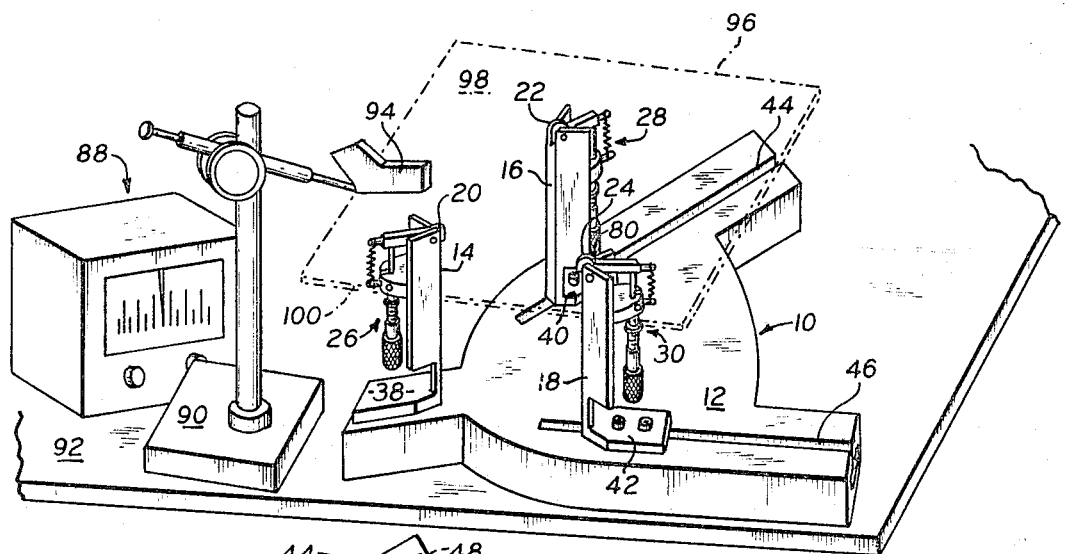
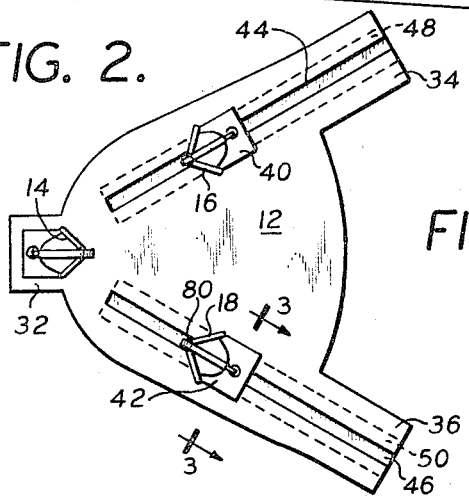
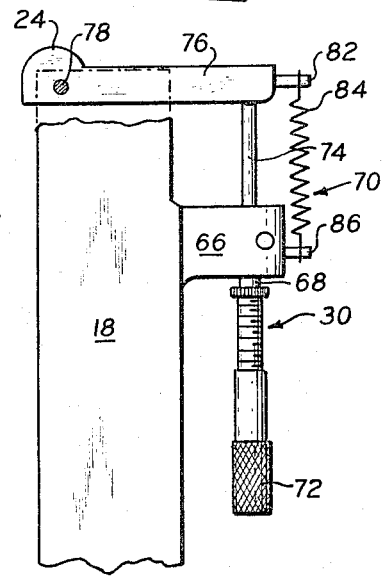
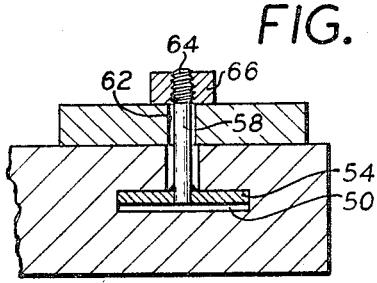

1

3,325,904
METHOD AND APPARATUS FOR ASSISTING IN THE MEASUREMENT OF SURFACE FLATNESS
Alfred S. Backus, Cedar Grove, N.J., assignor to Mycalex Corporation of America, Clifton, N.J., a corporation of New York
Filed Sept. 16, 1963, Ser. No. 309,024
2 Claims. (Cl. 33—174)

This invention relates to a method and apparatus for assisting in the measurement of surface flatness.

In countless components employed in present day technology, the requirement for a surface being "flat" appears. The method for measuring surface flatness is well established and convenient so long as the article containing the surface to be measured is one having a second surface which is parallel to the surface to be measured. In such an instance the article having a surface to be measured is placed on a reference flat surface with the surface to be measured extending upwardly and, thereafter, a surface flatness measurer is run over the surface to ascertain the flatness thereof. Flatness measurers are well known and generally take the form of an electromechanical transducer, much like the transducer used in a phonograph pickup with the output of the transducer going to a suitable indicator dial mechanism. The transducer needle is swept over a surface and as irregularities are encountered the transducer needle will move vertically whereby to cause a voltage to be generated by the transducer which voltage will be recorded by the mechanism. Naturally, if a surface is substantially flat there will be no movement of the voltage indicator in the mechanism. An example of such a flatness measurer is the Cleveland Ind-Ac Electrical Indicator. However, there are numerous other brands of indicators for measuring flatness on the market and any of these may be employed satisfactorily with the present invention.

However, the method above described does not work if the article in question does not have two surfaces which are parallel to one another. If the surface opposite the surface to be measured is at an angle thereto or is irregular or bumpy with bosses and protrusions and the like, then, when the article is placed on the reference flat surface, the surface to be measured will not be parallel to said flat surface and, accordingly, the surface flatness indicator will indicate vast surface irregularities which may or may not exist. It is primarily with such articles that the method and apparatus forming the subject of the present invention will find greatest utility. However, once having such apparatus it also may be used with satisfaction in connection with sheet material having parallel surfaces.

In accordance with the present invention, my apparatus, supports the article to be measured at only three points and the points of support are vertically adjustable. By utilizing a conventional flatness measurer I can adjust the points of support vertically until the points of the surface to be measured overlying said points of support will all be in the same horizontal plane. With these three points in the same horizontal plane, assuming an optically flat surface, all other points on that surface should also be in the plane. This can be determined by utilizing a conventional flatness measuring device and running it over the now horizontally oriented surface in the conventional manner.

It is therefore the main object of the present invention to provide a new and improved method and apparatus for assisting in the measurement of surface flatness.

Still a further object of the present invention is the provision of a new and improved method and apparatus for measuring surface flatness wherein the surface opposite to the surface to be measured is not flat and parallel to the surface to be measured.

2

The above and other objects, characteristics and features of the present invention will be more fully understood from the following description taken in connection with the accompanying illustrative drawing.

In the drawing:

FIG. 1 is a perspective view of the article embodying the present invention for assisting in the measurement of surface flatness;

FIG. 2 is a top plan view of my apparatus;

FIG. 3 is a sectional view taken along the line 3—3 in FIG. 2; and

FIG. 4 is a fragmentary side elevational view of the apparatus for adjusting the vertical position of one of the supporting points in my apparatus.

Referring now to the drawing in detail, the apparatus embodying the present invention is designated by the reference numeral 10. The apparatus or tool 10 comprises a plate-like base 12 and three upstanding pillars 14, 16 and 18 which are adapted to carry movable supports 20, 22 and 24. Adjusting means 26, 28 and 30 are respectively associated with vertically movable supports 20, 22 and 24 for adjusting the vertical position thereof.

Preferably, although not necessarily, the base 12 is substantially triangular in configuration and is provided with outstanding legs 32, 34 and 36 which support (at times) the pillars 14, 16 and 18, respectively. As shown herein each of the pillars is V-shaped in cross section and is connected at the bottom to a horizontally turned portion 38, 40 and 42 which is adapted to abut against the upper surface of the base 12. Horizontal portion 38 is shown as being fixed to the surface 12 which fixing may be effected by rivets, nuts and bolts, or as shown herein, by welding. The horizontal portions 40 and 42 are movably mounted on the base 12 by provision of T-shaped slots 44 and 46 in the upper surface of the base 12. Disposed within the horizontal portions 48 and 50 of the T-slots 44 and 46, respectively, are plates 52 and 54 which are adapted to slide within the respective horizontal slot portion. Fixed to the plates 52 and 54 and extending upwardly therefrom are studs 56 and 58 here shown to be in pairs, one pair for each plate 52 and 54. The studs 56 and 58 are adapted to extend up through the vertical portions of the T-slots 44 and 46 and through the horizontal portions 40 and 42 of the pillars 16 and 18, respectively, as through apertures 60 and 62 therein, respectively. The portions of the studs extending above the upper surface of the horizontal parts 40 and 42 are threaded as at 64 and a knurled nut 66 is disposed on each of said threaded portions. By tightening the nuts 66 the plates 52 and 54 are moved into clamping relation with the base 12 and specifically with the portions of the base 12 defining the upper surfaces of the horizontal portions of the T-slots. By such an arrangement, by loosening the knurled nut 66 the horizontal positions of the pillars 16 and 18 may be changed with respect to the fixed pillar 14. Of course, if desired, the pillar 14 may also be horizontally movable by making similar provisions as with respect to the pillars 16 and 18. Further, if desired, all pillars could be fixedly secured to the base 12.

The mechanisms 26, 28 and 30 for vertically adjusting the supporting points 20, 22 and 24 are all substantially identical. Accordingly, for brevity, the mechanism 30 alone will be described. This mechanism is best illustrated in FIG. 4. Referring now to FIG. 4, the pillar 18 is provided intermediate its upper and lower ends with a fixed supporting plate 66 which, as shown herein, is welded to the sidewalls of the pillar 18. Mounted on the plate 66 is the mounting section 68 of a conventional vernier micrometer head 70. As is well known to anyone skilled in the art, by rotating the knurled end portion 72 of the micrometer head 70 the spindle 74 will move vertically up or down depending upon the direction of rotation. The upper end of the micrometer 10 or spindle is in engagement with a lever 76 which is pivoted on a pin 78 fixed to the sidewalls of the pillar 18. In the vicinity of the lever 76 the sidewalls 18 are provided with a small cut-out 80 (FIGS. 1 and 2) to provide for a rocking movement of the lever 76 about the pin 78. The supporting point 24 is an integral portion of the lever 76 which is offset horizontally from pin 78 and may be seen as a rounded bump or protrusion on the upper edge surface thereof. To hold the lever 76 in continuous engagement with the top of the micrometer spindle 74, lever 76 is provided with a horizontally extending pin 82 on which one end of a biasing spring 84 is fixed, the other end of the biasing spring 84 being fixed to a pin 86 fixed in turn to the plate 66. Thus, the spring 84 biases the portion of the lever 76 to the right of the pivot pin 78 downwardly into engagement with the micrometer spindle. It will be seen that notwithstanding the accuracy and control that one obtains by utilizing the micrometer head 70 as the means for moving the horizontally offset point 24 up and down, this accuracy is greatly increased in the present construction due to the fact that the support point 24, through offset, is very close to the center of rotation of the lever 76, that is the pivot pin 78, whereas the point of action of the micrometer spindle 74 on the lever is spaced a substantial distance from the pivot pin 78. Therefore, for a given movement of the micrometer spindle 74, a substantially smaller movement of the support point 24 will be achieved. This permit extremely fine adjustment of the supporting point 24 relative to the other supporting points 20 and 22 as will now be described.

In use, a flatness indicator 88 of the type hereinbefore described and having a base 90 is placed on an optically flat reference surface 92 which may be a polished glass surface or the like previously indicated to have been flat. As shown herein the base 12 of the apparatus 10 is also placed on the surface 92 although this is not necessary. The flatness measurer 88 in addition to the base 90 has a transducer head 94 which is adapted to be swept over a surface to be measured as previously described.

The article 96 (shown in dotted lines in FIG. 1) having a surface 98 which is specified flat is placed on the supporting pins 20, 22 and 24 of apparatus 10 with the surface 100, which is opposite to the usrface 98, in actual physical engagement with the three supporting pins of the apparatus 10. In order to adapt the tool 10 for such support for the article 96, the thumb screws 66 on the spindles 58 are loosened whereby to release the pillars 16 and 18 for horizontal movement along their respective T-slots 44 and 46 to bring the supporting points 22 and 24 into position where they will be able to engage and support the article 96 in cooperation with the supporting point 20. When the pillars 16 and 18 are so positioned the nuts 66 are tightened to lock the pillars in horizontal position for the measurement of flatness of the surface 98. Thereafter the article 96 is laid over the three supporting points 20, 22 and 24 as illustrated in FIG. 1. The detector head 94 on the flatness detector 88 is then brought into engagement with the surface 98 at the three points overlying the supports 20, 22 and 24. By reading the detector 88 it can be determined whether these three points in surface 98 overlying the support points of the tool 10 are in parallel planar alignment with reference plane 92. If they are not, the micrometer mechanisms 70 can be operated in order to bring the three points on the upper surface into parallel planar alignment. Once they are in alignment then, assuming flatness for the surface 98, all other points on the surface should also be in planar alignment parallel with reference plane 92. Accordingly, the detector head 94 can then be swept over the entire surface 98 to determine its flatness.

It will be seen that the three points overlying the support points 20, 22 and 24 can be brought into planar alignment parallel with the reference plane irrespective of the shape or surface irregularities of the surface 100. Needless to say that by virtue of the fact that the support points 20, 22 and 24 are all individually adjustable, they need not be in planar alignment parallel to the reference plane in order for the points in surface 98 overlying the support points to be in such planar alignment. Accordingiy, the suruface 100 could be at an angle to the surface 98 or might have surface irregularities, bosses, depressions, and so forth, and this would not affect the operability of the device. As pointed out hereinbefore, with the present method of measuring surface flatness, such a result cannot be achieved.

While I prefer to utilize only three pillars with associated vertically adjustable support points, it will be understood that more than three such pillars could be employed without departing from the present invention. Further, if a tool of the present type is to be employed with a fixed sized object 96, then the horizontal adjustability of the pillars 16 and 18, as by the T-slot arrangement hereinbefore described, may be dispensed with. However, if a wide range of sizes of objects are to be employed, in order to get stable support for such objects, it is desirable that the pillars be horizontally adjustable. Further, the shape and configuration of the base 12, although desirable in the application described, may take other forms without departing from the spirit and scope of this invention.

While I have herein shown and described the preferred form of the present invention and have suggested various modifications therein, various other changes and modifications may be made therein within the scope of the appended claims without departing from the spirit and scope of this invention.

What I claim is:

1. Apparatus for orienting the surface of an article for measurement of the flatness thereof, comprising a base, three pillars on said base and extending upwardly therefrom, a horizontally extending lever for each of said pillars, each of said levers being pivotally mounted on its associated pillar and having a bearing point horizontally offset from said pivotal mounting, a micrometer head fixed to each of said pillars, each of said micrometer heads including a vertically movable micrometer spindle in engagement with its associated lever at a point which is horizontally offset from said pivotal mounting of said associated lever a distance that is substantially greater than the distance which said bearing point is horizontally offset therefrom, and means associated with each of said levers for biasing them into engagement with their associated micrometer spindles.

2. Apparatus as defined in claim 1, further comprising means for adjusting the relative horizontal positions of said pillars, and means for releasably holding said pillars in fixed relative horizontal position.

References Cited

UNITED STATES PATENTS

| | | | |
|---|---|---|---|
| 523,193 | 7/1894 | Baynard | 33—24 |
| 2,368,853 | 2/1945 | Levaggi | 33—24 |
| 2,410,888 | 11/1946 | Lucy | 33—175 X |
| 2,609,612 | 9/1952 | Mull | 33—174 |
| 2,620,655 | 12/1952 | Priest | 73—105 |
| 2,645,026 | 7/1953 | Trbojevich | 33—174 |
| 3,068,581 | 12/1962 | Skalwold et al. | 33—174 |
| 3,085,345 | 4/1963 | Pearson | 33—174 |

LEONARD FORMAN, *Primary Examiner.*

S. S. MATTHEWS, *Assistant Examiner.*